(12) United States Patent
Madej et al.

(10) Patent No.: US 8,925,815 B2
(45) Date of Patent: Jan. 6, 2015

(54) CHECKOUT SYSTEM FOR AND METHOD OF PREVENTING A CUSTOMER-OPERATED ACCESSORY READER FACING A BAGGING AREA FROM IMAGING TARGETS ON PRODUCTS PASSED THROUGH A CLERK-OPERATED WORKSTATION TO THE BAGGING AREA

(75) Inventors: Dariusz J. Madej, Shoreham, NY (US); Miroslav Trajkovic, East Setauket, NY (US); Igor R. Vinogradov, Oakdale, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 211 days.

(21) Appl. No.: 13/604,056

(22) Filed: Sep. 5, 2012

(65) Prior Publication Data

US 2014/0061308 A1    Mar. 6, 2014

(51) Int. Cl.
*G06K 7/00*    (2006.01)

(52) U.S. Cl.
USPC .......................................... 235/440; 235/383

(58) Field of Classification Search
USPC ................. 235/381, 375, 380, 385, 383, 440
See application file for complete search history.

(56) References Cited

U.S. PATENT DOCUMENTS

| | | | |
|---|---|---|---|
| 4,613,895 A | 9/1986 | Burkey et al. |
| 4,684,792 A | 8/1987 | Nickels, Jr. |
| 4,794,239 A | 12/1988 | Allais |
| 5,311,969 A | 5/1994 | Dickover et al. |
| 5,324,924 A | 6/1994 | Cai et al. |
| 5,703,349 A | 12/1997 | Meyerson et al. |
| 5,874,719 A | 2/1999 | Hippenmeyer et al. |
| 6,021,944 A | 2/2000 | Arakaki |
| 6,021,946 A | 2/2000 | Hippenmeyer et al. |
| 6,276,606 B1 | 8/2001 | Liou et al. |
| 7,097,104 B2 | 8/2006 | Silverbrook et al. |
| 7,108,187 B2 | 9/2006 | Turvy, Jr. et al. |
| 7,303,131 B2 | 12/2007 | Carlson et al. |
| 7,347,371 B2 | 3/2008 | Joseph et al. |
| 7,389,923 B2 | 6/2008 | Blanford |
| 7,644,865 B2 | 1/2010 | Barkan |
| 7,753,269 B2 | 7/2010 | Russell et al. |
| 8,245,926 B2 | 8/2012 | Guess |
| 2003/0226893 A1 | 12/2003 | Okada et al. |

(Continued)

FOREIGN PATENT DOCUMENTS

| | | |
|---|---|---|
| WO | 2008027170 A2 | 3/2008 |
| WO | 2010053721 A1 | 5/2010 |

OTHER PUBLICATIONS

Notice of Allowance mailed Oct. 3, 2013 in U.S. Appl. No. 12/290,797, Dariusz J. Madej, filed Nov. 4, 2008.

(Continued)

*Primary Examiner* — Karl D Frech
(74) *Attorney, Agent, or Firm* — Nong-Qiang Fan (57) ABSTRACT

A checkout system includes a clerk-operated bi-optical workstation through which products having target data are passed to a bagging area, and a customer-operated accessory reader having an accessory window facing the bagging area and a data capture assembly for capturing additional target data of additional targets associated with transaction-related items, particularly over a restricted range of working distances that terminates short of the bagging area, and for preventing the accessory reader from capturing the target data of the products in the bagging area.

20 Claims, 7 Drawing Sheets

(56) References Cited

U.S. PATENT DOCUMENTS

| | | |
|---|---|---|
| 2006/0038009 A1* | 2/2006 | Russell et al. ............ 235/383 |
| 2006/0043187 A1 | 3/2006 | He et al. |
| 2006/0065732 A1 | 3/2006 | Barkan |
| 2006/0163360 A1 | 7/2006 | Steusloff et al. |
| 2006/0192010 A1 | 8/2006 | Massieu et al. |
| 2007/0034696 A1 | 2/2007 | Barkan et al. |
| 2007/0063048 A1 | 3/2007 | Havens et al. |
| 2007/0164115 A1 | 7/2007 | Joseph et al. |
| 2008/0054075 A1 | 3/2008 | Barkan |
| 2010/0019042 A1 | 1/2010 | Barkan |
| 2010/0108766 A1 | 5/2010 | Madej et al. |
| 2011/0309147 A1 | 12/2011 | Barkan et al. |
| 2012/0043385 A1 | 2/2012 | Trajkovic et al. |
| 2012/0181338 A1 | 7/2012 | Gao |

OTHER PUBLICATIONS

International Search Report and Written Opinion for International Application No. PCT/US2009/061829 mailed on Mar. 26, 2010.

International Preliminary Report on Patentability for International Application No. PCT/US2009/061829 mailed on May 19, 2011.

Non Final Office Action mailed Aug. 1, 2011 in U.S. Appl. No. 12/290,797, Dariusz J. Madej, filed Nov. 4, 2008.

Final Office Action mailed Feb. 6, 2012 in U.S. Appl. No. 12/290,797, Dariusz J. Madej, filed Nov. 4, 2008.

Notice of Allowance mailed Mar. 23, 2012 in U.S. Appl. No. 12/290,797, Dariusz J. Madej, filed Nov. 4, 2008.

Notice of Allowance mailed Sep. 20, 2012 in U.S. Appl. No. 12/290,797, Dariusz J. Madej, filed Nov. 4, 2008.

Non Final Office Action mailed Aug. 6, 2012 in U.S. Appl. No. 12/860,190, Miroslav Trajkovic, filed Aug. 20, 2010.

Final Office Action mailed Oct. 10, 2012 in U.S. Appl. No. 12/860,190, Miroslav Trajkovic, filed Aug. 20, 2010.

Parikh, D., and Jancke, G., "Localization and Segmentation of a 2D High Capacity Color Barcode," 7 pages.

* cited by examiner

CHECKOUT SYSTEM FOR AND METHOD OF PREVENTING A CUSTOMER-OPERATED ACCESSORY READER FACING A BAGGING AREA FROM IMAGING TARGETS ON PRODUCTS PASSED THROUGH A CLERK-OPERATED WORKSTATION TO THE BAGGING AREA

FIELD OF THE DISCLOSURE

The present disclosure relates generally to a point-of-transaction checkout system having a workstation through which products bearing electro-optically readable targets are passed by a clerk to a baggage area, and a customer-operated accessory reader having an accessory window facing the baggage area for reading by image capture additional targets associated with transaction-related items and, more particularly, to a method of preventing the accessory reader from capturing images of the targets on the products already in the bagging area.

BACKGROUND

In the retail industry, horizontal or flat bed slot scanners, each having a single horizontal window; vertical slot scanners, each having a single upright or vertical window; and bi-optical scanners, each having both a horizontal window and an upright window, have been used to electro-optically read targets, such as one-dimensional bar code symbols, particularly of the Universal Product Code (UPC) type, and two-dimensional bar code symbols, such as PDF417 and QR codes, at full-service, point-of-transaction checkout systems operated by checkout clerks in supermarkets, warehouse clubs, department stores, and other kinds of retailers, for many years. Products to be purchased bear identifying target symbols and are typically slid by a clerk across a respective window, e.g., from right to left, or from left to right, in a "swipe" mode, to a bagging area. Alternatively, the clerk merely presents the target symbol on the product to, and holds the product momentarily steady at, a central region of a respective window in a "presentation" mode, prior to placing the product in the bagging area. The choice depends on the type of target, on clerk preference, and on the layout of the system.

Some checkout systems are laser-based workstations, and project a multitude of laser scan lines through a respective window. When at least one of the scan lines sweeps over a target symbol associated with a product, the symbol is processed, decoded and read. The multitude of scan lines is typically generated by a scan pattern generator which includes a laser for emitting a laser beam at a mirrored component mounted on a shaft for rotation by a motor about an axis. A plurality of stationary mirrors is arranged about the axis. As the mirrored component turns, the laser beam is successively reflected onto the stationary mirrors for reflection therefrom through the respective window as a scan pattern of the laser scan lines.

Other checkout systems are imager-based workstations, and have one or more solid-state imagers, or image sensors, analogous to those conventionally used in consumer digital cameras. Each imager has a one- or two-dimensional array of photocells or light sensors (also known as pixels), and an imaging lens assembly for capturing return light scattered and/or reflected from a target being imaged through a respective window over a field of view, and for projecting the return light onto the sensor array to initiate capture of an image of the target over a range of working distances in which the target can be read. The target may be a symbol, as described above, either printed on a label or displayed on a display screen of an electronic device, such as a smart phone. The target may also be a form, such as a document, label, receipt, signature, driver's license, employee badge, or payment/loyalty card, etc., each bearing alphanumeric characters, as well as a picture, to be imaged. Such an imager may include a one- or two-dimensional charge coupled device (CCD) or a complementary metal oxide semiconductor (CMOS) device and associated circuits for producing and processing electrical signals corresponding to a one- or two-dimensional array of pixel data over the field of view. These electrical signals are decoded and/or processed by a programmed microprocessor or controller into data related to the target being electro-optically read, e.g., decoded data indicative of a symbol, or into a picture of a target other than a symbol.

All of the above-described checkout workstations are typically operated by checkout clerks who pass the products through the workstations to the bagging areas for bagging and customer retrieval. In an effort to reduce, if not eliminate, the need for checkout clerks and their associated labor cost, and to improve the speed and efficiency of the checkout operation, a number of self-service, point-of-sale, checkout systems operated by the customer without the aid of the checkout clerk have been proposed. During operation of a self-service checkout system, the customer retrieves the individual products for purchase from a shopping cart or basket and/or from an entrance conveyor belt at the countertop, and moves the retrieved individual products across, or presents the individual products to, a scanner window to read their respective symbols, and then places the read products onto an exit conveyor belt at the countertop for delivery to the bagging area, for packing in carry-out bags. The customer then pays for his or her purchases either at the self-service checkout system if so equipped with a credit/debit card reader, or at a central payment area that is staffed by a store employee. Thus, the self-service checkout system permits the customer to select, itemize, and, in some cases, pay for his or her purchases, without the assistance of the retailer's personnel.

However, self-service is not readily available if the aforementioned and increasingly popular, bi-optical workstation is installed at a checkout system. The upright window faces the clerk, not the customer. A rear wall of the bi-optical workstation rises from the countertop and faces the customer. As a result, the customer does not have ready access to either window of the bi-optical workstation and cannot assist in the checkout procedure, even if the customer wanted to, because the rear wall blocks such access. This lack of self-service potentially causes such bi-optical workstations to go unused or underutilized, and their expense to be economically unjustified. Bi-optical workstations occupy valuable real estate in a retailer's operation, which might otherwise be used for self-service systems.

In order to have the customer participate in the checkout procedure despite the presence of the bi-optical workstation, it has been proposed to install a supplemental accessory reader having an accessory window at the checkout system. This accessory reader is independently operated by the customer. For example, this accessory reader can be used to read any target, such as a printed code, or an electronic code electronically displayed on a screen of a communications device, e.g., a smartphone, or a non-coded target, independently of the assistance of the clerk, on any item related to the transaction. These transaction-related items might be loyalty cards, identification cards, coupons, smartphones, and even countertop merchandise bought on impulse. For such reasons, among others, as privacy, hygiene, and security, many customers do not wish to hand over identification cards, such as drivers' licenses containing age data, to the clerk, and would instead prefer to operate the accessory reader. Due to the increasing popularity of coupons being delivered over smartphones, and thus the increased likelihood that the customer's smartphone will be handled during checkout, many retailers also prefer that the customer operate the accessory reader out of concern for legal liability in the event that the clerk accidentally drops the customer's smartphone.

However, as advantageous as the use of such accessory readers in combination with a workstation has been, one concern relates to preventing the accessory reader from capturing the targets on the products already in the bagging area, especially when the accessory window is so positioned as to face the bagging area. Since these products in the bagging area have already been scanned and read by the workstation, it is unacceptable for them to be accidentally scanned and read again by the accessory reader.

Accordingly, there is a need to prevent the accessory reader from capturing the targets on the products already in the bagging area.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a checkout system comprising a bi-optical workstation that is operated by a clerk, and an accessory reader that is operated by a customer. The workstation has a first workstation window located in a generally horizontal plane, and a second workstation window located in a generally upright plane that intersects the generally horizontal plane. Both of the workstation windows face and are accessible to the clerk for enabling the clerk to pass products to be checked out in a transaction through the workstation to a bagging area. The workstation has a data capture arrangement for capturing through at least one of the workstation windows target data of targets associated with the products to be checked out by the clerk.

The accessory reader has an accessory window facing the bagging area and accessible to the customer for enabling the customer to interact with the accessory reader. Preferably, the workstation windows bound a zone through which the products are passed along a transaction path to the bagging area, and the accessory window is upright and planar and faces downstream of the transaction path. The accessory reader has a data capture assembly for capturing additional target data of additional targets associated with items related to the transaction, and for preventing the accessory reader from capturing the target data of the targets associated with the products in the bagging area.

Preferably, the data capture arrangement at the workstation includes at least one solid-state workstation imager for capturing through at least one of the workstation windows an image of the target data of the targets associated with the products, and a workstation microprocessor operatively connected to the at least one imager for processing the image of the target data. The data capture assembly at the accessory reader also includes at least one solid-state accessory imager for capturing through the accessory window an image of the additional target data of the additional targets associated with the transaction-related items over a restricted range of working distances that terminates short of the bagging area, and an accessory microprocessor operatively connected to the accessory imager for processing the image of the additional target data.

There are various ways of restricting the range of the working distances so that the range of the accessory reader terminates short of the bagging area. In one embodiment, an imaging lens assembly of the data capture assembly is designed to have a restricted depth of focus that limits the restricted range to a set of close-in working distances relative to the accessory window. In another embodiment, a memory stores a reference maximum distance relative to the accessory window, and a distance sensor is employed for measuring a target distance to a target, in which case, the accessory microprocessor compares a measured target distance with the reference maximum distance, and processes the image of the additional target data when the measured target distance does not exceed the reference maximum distance.

In still another embodiment, a memory stores a known set of values of optical characteristics of a target when the target lies in the restricted range. These optical characteristics can be size or contrast ratios between elements of the target, e.g., when the target is a symbol having elements (bars and spaces) of different widths and reflectivities, the size and contrast ratios between the bars and the spaces are different. In this case, the accessory microprocessor determines values of the optical characteristics of the target, compares the determined values with the stored values, and processes the image of the additional target data when the determined values do not exceed the stored values.

In an additional embodiment, a memory stores a reference maximum distance relative to the accessory window, and an aiming light assembly projects an aiming light pattern on a target, and the accessory microprocessor determines a target distance of the target based on a position of the aiming light pattern in the image, compares a determined target distance with the reference maximum distance, and processes the image of the additional target data when the determined target distance does not exceed the reference maximum distance.

In another embodiment, an illumination light assembly having a plurality of illumination light sources is employed for illuminating a target, in which case, the accessory microprocessor determines whether reflected bright light spots from the illumination light sources exist in the image, and processes the image of the additional target data when the light spots are found in the image. In a variant, two, and preferably more, of the illumination light sources are spaced apart in the accessory reader, and a memory is employed for storing a known set of values of spot distances between the reflected bright light spots from the two illumination light sources when the target lies in the restricted range. In this case, the accessory microprocessor determines a value of spot distance in the image, compares a determined value of the spot distance with the stored values, and processes the image of the additional target data when the determined value does not exceed the stored values.

Instead of, or as a complement to, range restriction, target motion tracking may be employed to determine if a target is in the bagging area. In this embodiment, the accessory imager is operative for capturing through the accessory window successive images of the additional target data over successive frames, in which case, the accessory microprocessor and/or the workstation microprocessor compares the successive images to track motion of the target. For example, no motion would indicate that the product is indeed in the bagging area, and any additional target data derived from the stationary product would be rejected.

Instead of, or as a complement to, range restriction, target cross-checking between the workstation and the accessory reader may be employed. In this embodiment, a memory stores a list of all the target data of the targets associated with the products that have been read at the workstation, and at least one of the microprocessors checks the additional target data of the additional targets associated with the items that have been read at the accessory reader against the stored list to determine if the additional target data has already been read. If the additional target data has already been read, then it is assumed that the item is in the bagging area, and the reading is rejected.

A method, in accordance with another aspect of this disclosure, is performed by configuring a bi-optical workstation with a first workstation window located in a generally horizontal plane, and a second workstation window located in a generally upright plane that intersects the generally horizontal plane; positioning the workstation windows to face and be accessible to a clerk to enable the clerk to interact and operate the workstation; capturing through at least one of the workstation windows target data of targets associated with products to be checked out by the clerk in a transaction, by passing the products through the workstation to a bagging area; configuring an accessory reader with an accessory window that is accessible to a customer for enabling the customer to interact and operate the accessory reader; positioning the accessory window to face the bagging area; capturing additional target data of additional targets associated with items related to the transaction, preferably over a restricted range of working distances that terminates short of the bagging area; and preventing the accessory reader from capturing the target data of the targets associated with the products in the bagging area.

Figure 1:
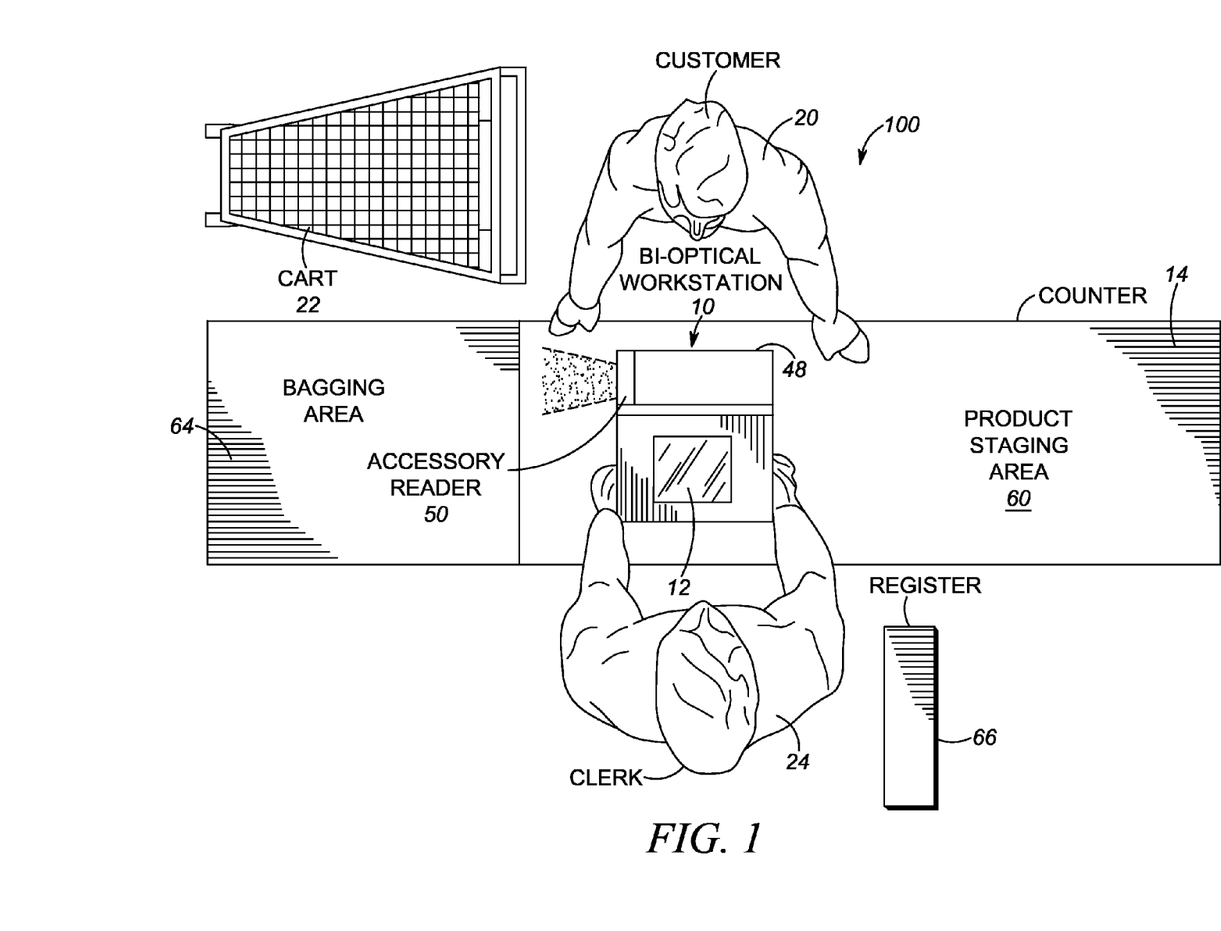
FIG. 1 is a top plan view of a checkout system for processing products associated with targets electro-optically readable by a clerk-operated workstation, and for processing transaction-related items associated with additional targets electro-optically readable by image capture by a customer-operated accessory reader in accordance with this disclosure.
Figure 2:
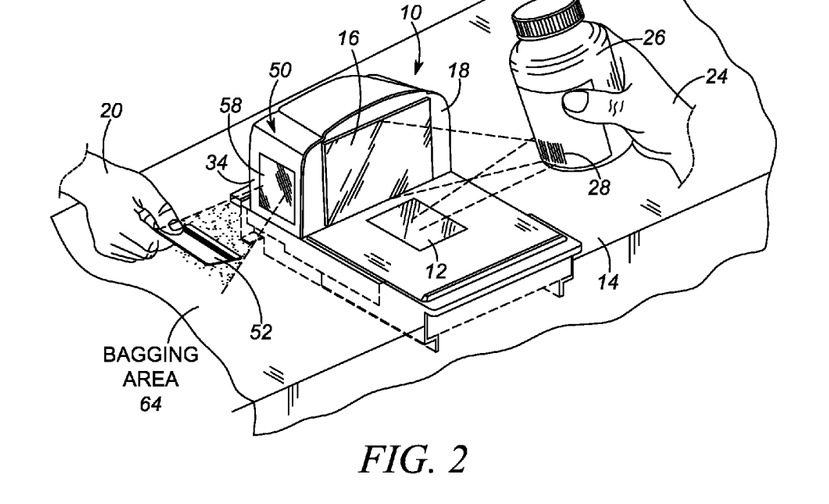
FIG. 2 is a broken-away perspective view of the system of FIG. 1 during reading.
Figure 3:
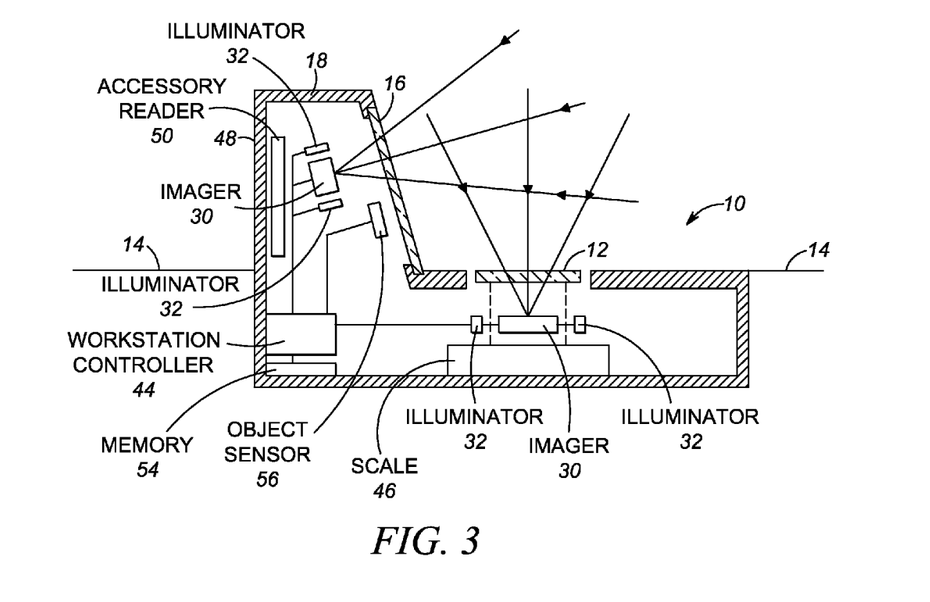
FIG. 3 is a schematic diagram of various components of the workstation of FIG. 1.

A checkout system 100, as depicted in FIG. 1, includes a dual window, bi-optical, point-of-transaction workstation 10 used by retailers at a checkout counter to process transactions involving the purchase of products 26 (see FIG. 2) bearing an identifying target, such as the UPC symbol 28 described above. As best seen in FIGS. 2-3, the workstation 10 has a generally horizontal planar window 12 elevated, or set flush with, a countertop 14, and a vertical or generally vertical, i.e., tilted, (referred to as "upright" hereinafter) planar window 16 set flush with, or recessed into, a raised housing portion 18 above the countertop 14. The workstation 10 either rests directly on the countertop 14, or rests in a well formed in the countertop 14. The raised housing portion 18 has a rear wall 48.

Returning to FIG. 1, both of the windows 12, 16 are positioned to face and be accessible to a clerk 24 standing at one side of the counter for enabling the clerk 24 to interact with the workstation 10, and with a cash register 66 to enable the clerk to receive payment for the purchased products. The register 66 may include a debit/credit card reader and a receipt printer to print a receipt. A keypad may also be provided at the register 66 to enable manual entry of information, such as an identifying code for any purchased product not bearing a symbol, by the clerk 24.

A product staging area 60 is located on the countertop 14 at one side of the workstation 10. The products 26 are typically placed on the product staging area 60 by a customer 20 standing at the opposite side of the counter. The customer 20 typically retrieves the individual products for purchase from a shopping cart 22 or basket for placement on the product staging area 60. A non-illustrated conveyor belt could be employed for conveying the products 26 to the clerk 24.

As previously described, the rear wall 48 of the bi-optical workstation 10 rose from the countertop 14 and faced the customer 20 in the prior art. As a result, the customer 20 did not have ready access to either window 12 or 16 of the bi-optical workstation 10 and could not assist in the checkout procedure, even if the customer 20 wanted to, because the rear wall 48 blocked such access. Thus, in order to have the customer 20 participate in the checkout procedure despite the presence of the bi-optical workstation 10, a supplemental accessory reader 50 is provided at the checkout system 100. This accessory reader 50 is illustrated as being located on, or built into, the workstation 10, but could equally well be located remotely from the workstation 10. This accessory reader 50 is independently operated by the customer 20. This accessory reader 50 can be used to read any additional target, such as a printed code, or an electronic code displayed by a smartphone, or a non-coded target, independently of the assistance of the clerk 24, associated with any item related to the transaction. These additional targets are provided on items 52 (see FIG. 2), such as loyalty cards, identification cards, drivers' licenses, coupons, smartphones, and even countertop merchandise bought on impulse. For reasons of privacy, hygiene, and security, many customers do not wish to hand over identification cards, such as drivers' licenses containing age data, to the clerk 24, and would instead prefer to operate the accessory reader 50 themselves, and, indeed, many retailers prefer this, too, out of concern for legal liability in case the clerk accidentally drops a smartphone.

As schematically shown in FIG. 3, a data capture arrangement, advantageously including a plurality of imaging readers, each including a solid-state workstation imager 30 and an illuminator 32, is mounted at the workstation 10, for capturing light passing through either or both windows 12, 16 from a target that can be a one- or two-dimensional symbol, such as a two-dimensional symbol on a driver's license, or any document. Each workstation imager 30 is a solid-state area array, preferably a CCD or CMOS array. Each workstation imager 30 preferably has a global shutter. Each illuminator 32 is preferably one or more light sources, e.g., one or more surface-mounted, light emitting diodes (LEDs), located at each workstation imager 30 to uniformly illuminate the target.

In use, the clerk 24 processes each product 26 bearing a UPC symbol or target 28 thereon, past the windows 12, 16 by swiping the product 26 across a respective window, or by presenting the product 26 by holding it momentarily steady at the respective window, before passing the product 26 to a bagging area 64 that is located at the opposite side of the workstation 10. The target 28 may be located on any of the top, bottom, right, left, front and rear, sides of the product, and at least one, if not more, of the workstation imagers 30 will capture the illumination light reflected, scattered, or otherwise returning from the target through one or both windows as an image. FIG. 2 also schematically depicts that a weighing scale 46 can be mounted at the workstation 10. The generally horizontal window 12 advantageously serves not only as a weighing platter for supporting a product to be weighed, but also allows the return light to pass therethrough.

As schematically shown in FIG. 3, an object sensor 56 is also mounted at the workstation 10 for detecting when each product 26 enters and exits the workstation 10. The object sensor 56 may advantageously include two pairs of infrared (IR) light emitting diode (LED) emitters and IR detectors. Each IR emitter directs IR light, which is invisible to the human eye, in a wavelength range from about 700 nm to about 1100 nm, over a viewing angle through the workstation window at the target 28 for return therefrom for detection by the IR detector for detecting return IR light returned from the target 28 over an object detection field of view. The viewing angle of each emitter is approximately equal to the object detection field of view of the IR detector for better system efficiency and pointing in the direction of the target. The object detection field of view substantially overlaps the reading field of view. The object sensor 56 need not be IR-based, but could instead be any motion or proximity sensor.

The workstation imagers 30, the associated illuminators 32, and the object sensor 56 are operatively connected to a programmed workstation microprocessor or controller 44 operative for controlling the operation of these and other components. Preferably, the workstation microprocessor 44 is tasked with processing the return light scattered from each target 28, and with decoding the captured target image of the return light. A memory 54 is operatively bidirectionally connected to the workstation microprocessor 44.

In operation, an active mode for the workstation microprocessor 44 is initiated when the object sensor 56 detects that a product 26 has entered the workstation 10. The workstation microprocessor 44 then sends successive command signals to the illuminators 32 to pulse the LEDs for a short time period of 300 microseconds or less, and successively energizes the workstation imagers 30 to collect light from the target 28 only during said time period, also known as the exposure time period. By acquiring a target image during this brief time period, the image of the target 28 is not excessively blurred even in the presence of relative motion between the workstation imagers and the target. A typical array needs about 11 to 33 milliseconds to acquire the entire target image and operates at a frame rate of about 30 to 90 frames per second. The array may have on the order of one million addressable sensors. The active mode ends when the object sensor 56 detects that the product 26 has exited the workstation 10, or when the workstation microprocessor 44 has successfully decoded the target 28. Once the active mode ends, then a standby mode, as described below, begins.

Figure 4:
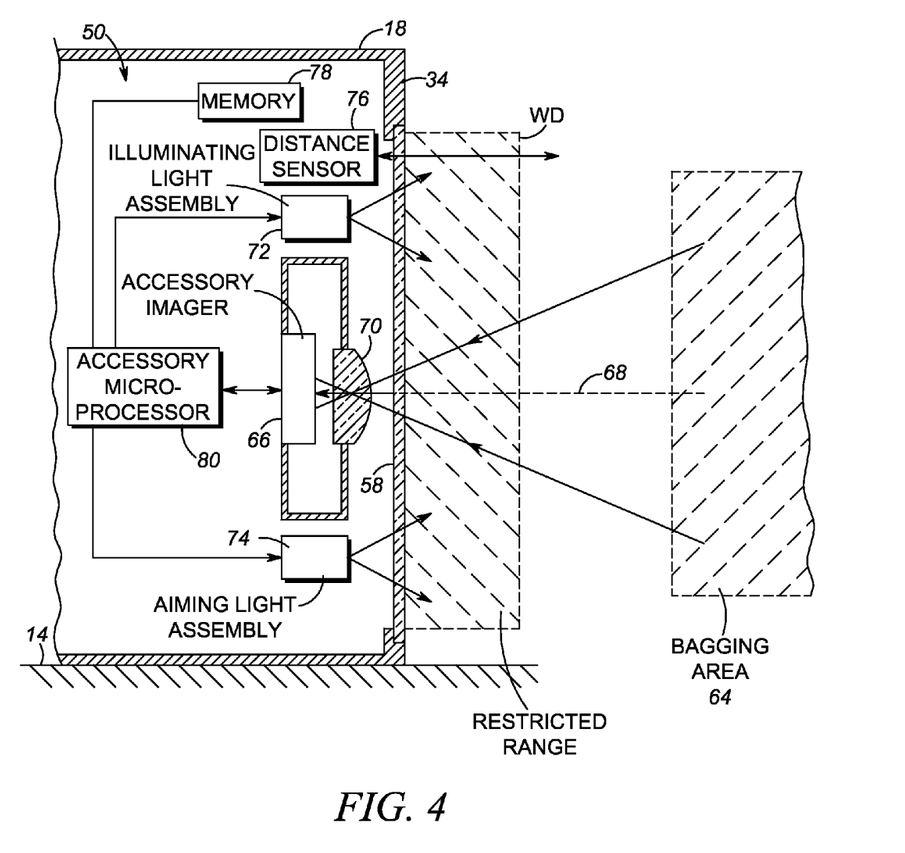
FIG. 4 is a broken-away schematic diagram of various components of the accessory reader of FIG. 1.

Turning now to FIGS. 2 and 4, the built-in accessory reader 50 has an accessory window 58 preferably supported on a side wall 34 of the raised housing portion 18. The accessory window 58 is positioned to face the bagging area 64 and to be accessible to the customer 20 for enabling the customer to interact with the accessory reader 50. The workstation windows 12, 16 bound a zone through which the products 26 are passed along a transaction path to the bagging area 64, and the accessory window 58 is upright, planar and faces downstream of the transaction path. Preferably, the accessory window 58 lies in a vertical plane that is perpendicular to the horizontal window 12, and that also intersects the plane of the upright window 16. In use, the customer 20 processes each additional target on each transaction-related item 52 past the accessory window 58 by swiping the additional target on each transaction-related item 52 across the accessory window 58, or by presenting the additional target on each transaction-related item 52 by holding it momentarily steady at the accessory window 58.

As schematically shown in FIG. 4, the accessory reader 50 also has a data capture assembly for capturing additional target data of the additional target on each item 52 related to the transaction. The data capture assembly of the accessory reader 50 includes an image sensor or imager 66 and an imaging lens assembly 70 mounted in front of the imager 66. The imager 66 is a solid-state device, for example, a CCD or a CMOS imager and has a linear or area array of addressable image sensors or pixels, preferably of submegapixel or supermegapixel size, having a reading field of view that diverges away from the window 58 in both horizontal and vertical directions. The imaging lens assembly 70 has a plurality of lenses, e.g., a Cooke triplet, arranged along an optical axis 68 that is generally perpendicular to the window 58 and is operative for capturing light through the window 58 from the additional target on the transaction-related item 52 located in a restricted range of working distances, as described below, along the optical axis 68, as measured from the window 58 to a maximum working distance WD. In a preferred embodiment, the restricted range begins at, or in the immediate vicinity of, the window 58 (zero inches) and ends at the maximum working distance WD of about six inches from the window 58.

An illumination light assembly 72 is also mounted in the accessory reader 50 and preferably includes a plurality of illumination light sources, e.g., two or more light emitting diodes (LEDs) arranged around the imager 66, and a corresponding number of illumination lenses mounted in front of the illumination LEDs to uniformly illuminate the additional target on item 52 with illumination light.

An aiming light assembly 74 is also mounted in the accessory reader 50 and is operative for projecting an aiming light pattern or mark, such as a "crosshair" pattern, with aiming light from an aiming light source, e.g., an aiming laser or one or more LEDs, through aiming lenses on the additional target on item 52. The customer 20 aims the aiming pattern on the additional target on item 52 to be imaged. A distance sensor 76 is optionally mounted in the accessory reader 50 and is operative for measuring a target distance to the additional target on item 52, as further described below.

Returning to FIG. 4, the imager 66, the illumination light assembly 72, the aiming light assembly 74 and the distance sensor 76 are operatively connected to a controller or programmed accessory microprocessor 80 operative for controlling the operation of these electrical components. A memory 78 is connected and accessible to the accessory microprocessor 80. In operation, the accessory microprocessor 80 sends a command signal to energize the illumination light assembly 72 to pulse the illumination LEDs for a short time period of, for example, 500 microseconds or less, and to energize the imager 66 to collect illumination light reflected and/or scattered from the additional target on item 52 substantially only during said time period. A typical imager needs about 16-33 milliseconds to read the entire target image and operates at a frame rate of about 30-90 frames per second. The memory 78 can buffer multiple images of the additional target on item 52 captured over successive frames.

The accessory microprocessor 80 may be tasked with processing and decoding the image from the additional target on item 52, or the accessory microprocessor 88 may be tasked solely with acquiring the additional target data from the additional target on item 52, and for sending the acquired additional target data to the workstation microprocessor 44, which then is responsible for processing and decoding the image from the additional target on item 52. This processing and decoding of the image from the additional target on item 52 is performed by the workstation microprocessor 44 during the aforementioned standby mode, when the workstation microprocessor 44 is not occupied with processing and decoding the image from the target 28. Thus, image processing is advantageously tasked away from the accessory microprocessor 80 of the accessory reader 50 to the workstation microprocessor 44, and is performed when the workstation microprocessor 44 is not actively processing any images, i.e., during the standby mode. The image processing burden imposed on the accessory microprocessor 80 of the accessory reader 50 is thereby reduced.

In accordance with this disclosure, there are various ways of preventing the accessory reader 50 from capturing the target data of the targets 28 associated with the products 26 in the bagging area 64. For example, the range of the working distances can be restricted so that the range of the accessory reader 50 terminates short of the bagging area 64. As schematically shown in FIG. 4, the restricted range begins at, or in the immediate vicinity of, the window 58 (zero inches) and ends at the maximum working distance WD of about six inches from the window 58. The baggage area begins at about ten inches away from the window 58 and ends several feet away.

In one range-restriction embodiment, the lenses of the imaging lens assembly 70 of the data capture assembly are specifically designed with optical powers so as to have a restricted depth of focus that limits the restricted range to a set of close-in working distances relative to the accessory window 58.

In another range-restriction embodiment, the memory 78 stores a reference maximum distance relative to the accessory window 58, and the distance sensor 76 is operative for measuring a target distance to a target, in which case, the accessory microprocessor 80 compares a measured target distance with the reference maximum distance, and processes the image of the additional target data when the measured target distance does not exceed the reference maximum distance.

In still another range-restriction embodiment, the memory 78 stores a known set of values of optical characteristics of a target when the target lies in the restricted range. As described in U.S. Patent Publication No. 2010/0108766, the entire contents of which are incorporated herein by reference thereto, these optical characteristics can be size or contrast ratios between elements of the target, e.g., when the target is a symbol having elements (bars and spaces) of different widths and reflectivities, the size and contrast ratios between the bars and the spaces are different. In this case, the accessory microprocessor 80 determines values of the optical characteristics of the target, compares the determined values with the stored values, and processes the image of the additional target data when the determined values do not exceed the stored values.

In an additional range-restriction embodiment, the memory 78 stores a reference maximum distance relative to the accessory window 58, and the aiming light assembly 74 projects an aiming light pattern on a target, and the accessory microprocessor 80 determines a target distance of the target based on a position of the aiming light pattern in the image, compares a determined target distance with the reference maximum distance, and processes the image of the additional target data when the determined target distance does not exceed the reference maximum distance.

Figure 5:
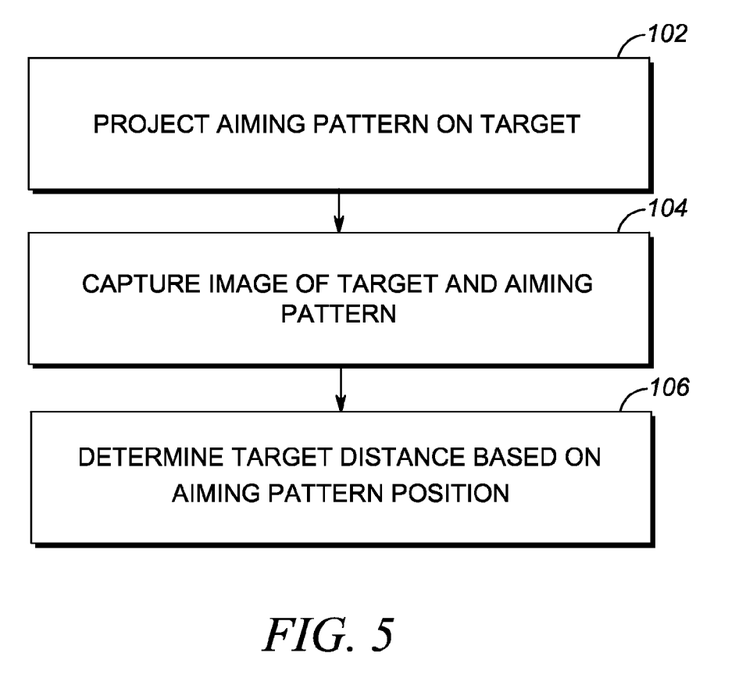
FIG. 5 is flow chart depicting one embodiment for restricting the working distance range of the accessory reader of FIG. 1.

Thus, as described in U.S. Patent Publication No. 2012/0043385, the entire contents of which are incorporated herein by reference thereto, and as shown in FIG. 5, the aiming light pattern is projected onto the target by having the accessory microprocessor 80 energize the aiming light assembly 74 in step 102. The entire image of the target and of the aiming pattern is captured by having the accessory microprocessor 80 energize the imager 66 in step 104. The determination of the distance of the target relative to the accessory window 58 based on the position of the aiming light pattern in the captured image is performed by the accessory microprocessor 80 in step 106, as described in U.S. Pat. No. 7,303,131 and U.S. Pat. No. 7,347,371, the entire contents of said patents also being incorporated herein by reference thereto.

Figure 6:
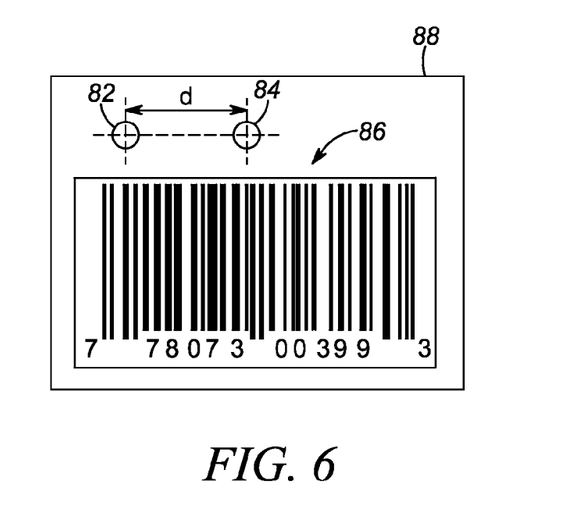
FIG. 6 is a view depicting another embodiment for restricting the working distance range of the accessory reader of FIG. 1.

In another range-restriction embodiment, the illumination light assembly 72 has a plurality of spaced-apart illumination light sources and is operative for illuminating a target. FIG. 6 depicts a captured image 86 of the additional target of a transaction-related item 52, as well as a captured image 88 of the item 52. FIG. 6 also depicts a pair of reflected bright light spots 82, 84 derived from two illumination light sources in the captured image. These bright light spots 82, 84 can, for example, occur as reflections off a screen of a smartphone.

The accessory microprocessor 80 determines whether the reflected bright light spots 82, 84 from the illumination light sources exist in the image. If so, then the accessory microprocessor 80 knows that the captured image came from a smartphone, and can unconditionally accept the captured image 86, and processes the image 86 of the additional target data. Otherwise, the accessory microprocessor 80 can perform another evaluation, such as a distance measurement to the target.

In a variant, the illumination light sources are spaced apart by known distances in the accessory reader 50, and the memory 78 is operative for storing a known set of values of spot distances (d) between the reflected bright light spots 82, 84 (see FIG. 6) when the target lies in the restricted range. The spot distance values are inversely proportional to the distance as measured away from the window 58. In this case, the accessory microprocessor 80 determines a value of spot distance in the image, compares a determined value of the spot distance with the stored values, and processes the image of the additional target data when the determined value does not exceed the stored values.

Figure 8:
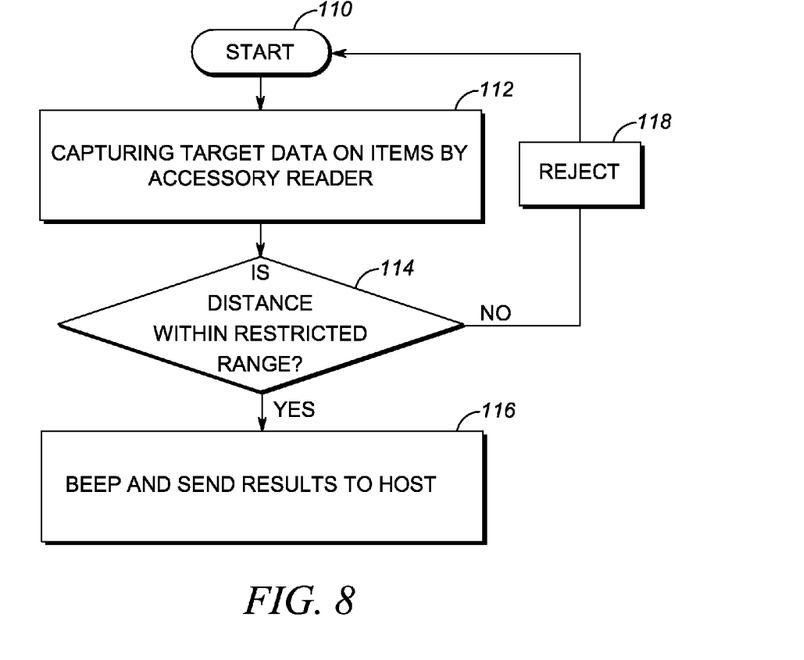
FIG. 8 is a flow chart depicting steps performed including target distance measurement in accordance with the method of the present disclosure.

Turning now to the flow chart of FIG. 8, a checkout method is performed, starting in step 110, by capturing additional target data of additional targets associated with items 52 related to the transaction by the accessory reader 50 in step 112. In step 114, the distance of the additional target is determined and evaluated to see if it lies within a restricted range of working distances that terminates short of the bagging area 64. If so, then the additional target data is decoded and read and sent to a host computer in step 116. If not, then the additional target data is not decoded and is rejected in step 118.

Figure 7:
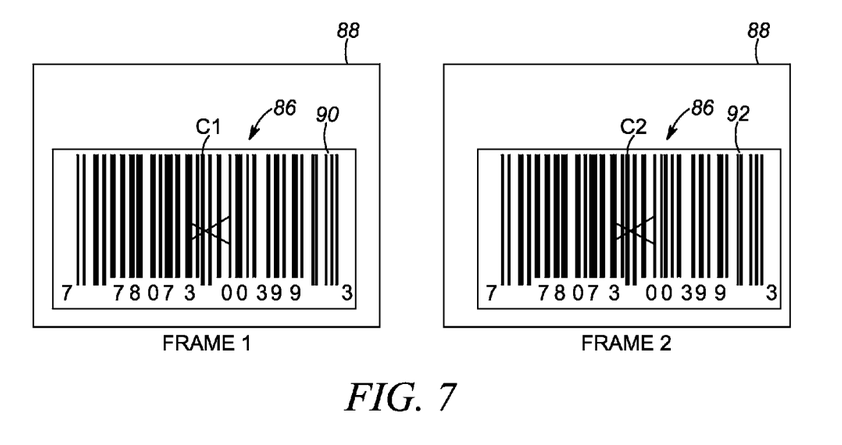
FIG. 7 is a set of successive views depicting how motion tracking is employed to restrict the working distance range of the accessory reader of FIG. 1.

Instead of, or as a complement to, distance estimation, tracking of the motion of the target over time can be used to determine whether the target is from a product 26 in the bagging area 64, or from an item 52 presented to the accessory reader 50 by the customer 20. Typically, a product in the bagging area is stationary, while a customer-presented item 52 is moving. In order to track the motion of a target, successive images 86 are captured over successive frames of the imager 66, as depicted in FIG. 7. A position of the target in the captured image of each frame is determined. For example, a center (C1) of a virtual bounding box 90 containing a first captured image 86 is initially determined, and followed by determining a center (C2) of a virtual bounding box 92 containing a second captured image 86.

If these centers C1, C2 overlap one another, then the target is stationary, and is considered to be in the bagging area 64, and no decode data are outputted. If these centers C1, C2 are offset from one another, then the target is moving, and is considered to be presented to the accessory reader 50 by the customer 20, and the decode data are outputted. In this latter case, the motion could be further defined as linear, or non-linear. If non-linear, then the moving target is considered to be presented to the accessory reader 50 by the customer 20. If linear, then the moving target may be considered as being in the bagging area and being pushed by other products entering the baggage area.

Figure 9:
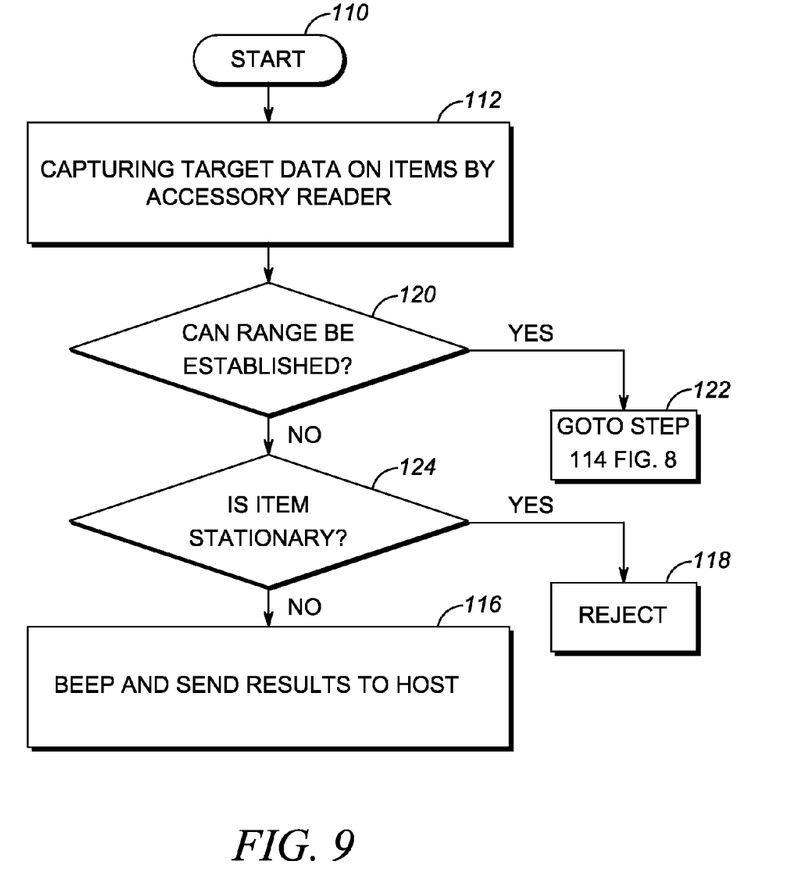
FIG. 9 is a flow chart depicting steps performed including target motion tracking in accordance with the method of the present disclosure.

Turning now to the flow chart of FIG. 9, as before, starting in step 110, additional target data of additional targets associated with items 52 related to the transaction are captured by the accessory reader 50 in step 112. In step 120, at least one of the microprocessors 44, 80 evaluates whether the range to the target can be determined. If so, then steps 114, 116, 118, as set forth in FIG. 8, are performed. If not, then at least one of the microprocessors 44, 80 evaluates whether the target is moving or stationary in step 124. If stationary, then the target is deemed to be in the bagging area 64, and the additional target data is rejected in step 118. If moving, then the target is deemed to not be in the bagging area 64, and the additional target data is decoded and read and sent to a host computer in step 116.

In a further embodiment that is employed either instead of, or as a complement to, distance estimation, the memory 54 stores a list of all the target data of the targets 28 associated with the products 26 that have been read at the workstation 10, and the workstation microprocessor 44 checks the additional target data of the additional targets associated with the items 52 that have been read at the accessory reader 50 against the stored list to determine if the additional target data has already been read. If the additional target data has already been read, then it is assumed that the item is in the bagging area 64, and the reading is rejected.

Figure 10:
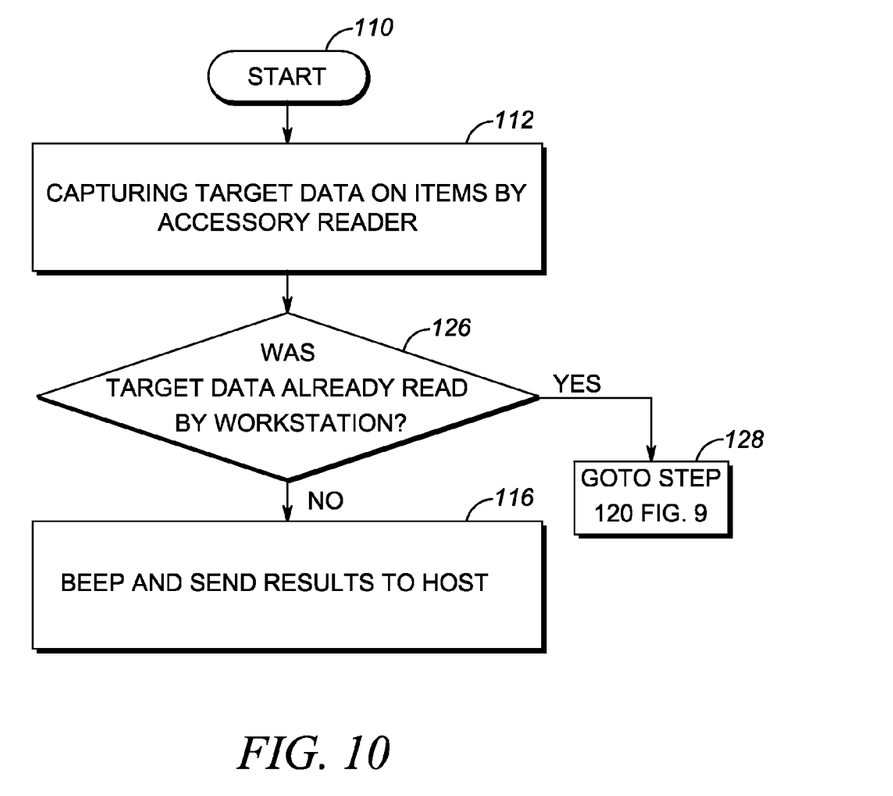
FIG. 10 is a flow chart depicting steps performed including target cross-checking in accordance with the method of the present disclosure.

Turning now to the flow chart of FIG. 10, as before, starting in step 110, additional target data of additional targets associated with items 52 related to the transaction are captured by the accessory reader 50 in step 112. In step 126, at least one of the microprocessors 44, 80 evaluates whether the target data was already read by the workstation 10. If so, then steps 120, 122, as set forth in FIG. 9, are performed. If not, then the additional target data is decoded and read and sent to a host computer in step 116.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

As an example, the accessory reader 50 need not be built into the workstation, as shown, but could instead be remote therefrom and have any shape, including being configured as a gun-shaped housing. The accessory reader 50 need not be fixed in position, but could instead be portable and light-weight and removable from the countertop 14 by the customer 20, in order to aim the accessory window 58 at the additional target on item 52, preferably at an item too heavy, or too large, or too bulky to be easily positioned in front of the accessory window 58.

As further examples, the workstation 10 need not be configured as a bi-optical workstation, but could instead be configured as a horizontal or flat bed slot scanner having a single horizontal window; or as a vertical slot scanner having a single upright or vertical window. The workstation 10 need not be imager-based, but could instead be laser-based. An imager-based workstation need not have the configuration depicted in FIG. 3, but instead could have one or more imagers, each having a field of view split by optical splitters and by a plurality of fold mirrors into a plurality of subfields for greater coverage.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A checkout system, comprising:
a bi-optical workstation operated by a clerk, the workstation having a first workstation window located in a generally horizontal plane, and a second workstation window located in a generally upright plane that intersects the generally horizontal plane, both of the workstation windows facing and being accessible to the clerk for enabling the clerk to pass products to be checked out in a transaction through the workstation to a bagging area, the workstation having a data capture arrangement for capturing through at least one of the workstation windows target data of targets associated with the products to be checked out by the clerk; and
an accessory reader installed inside the workstation and operated by a customer, the accessory reader having an accessory window facing the bagging area and being accessible to the customer for enabling the customer to interact with the accessory reader, the accessory reader having a data capture assembly for capturing additional target data of additional targets associated with items related to the transaction, and for preventing the accessory reader from capturing the target data of the targets associated with the products in the bagging area.

2. The system of claim 1, and the workstation windows bound a zone through which the products are passed along a transaction path to the bagging area, and wherein the accessory window is upright and faces downstream of the transaction path.

3. The system of claim 1, wherein the data capture arrangement at the workstation includes at least one solid-state workstation imager for capturing through at least one of the workstation windows an image of the target data, and a workstation microprocessor operatively connected to the at least one imager for processing the image of the target data.

4. The system of claim 1, wherein the data capture assembly at the accessory reader includes at least one solid-state accessory imager for capturing through the accessory window an image of the additional target data over a restricted range of working distances that terminates short of the bagging area; and an accessory microprocessor operatively connected to the accessory imager for processing the image of the additional target data.

5. The system of claim 4, wherein the data capture assembly at the accessory reader includes an imaging lens assembly having a restricted depth of focus that limits the restricted range to a set of close-in working distances relative to the accessory window.

6. The system of claim 4, wherein the data capture assembly at the accessory reader includes a memory for storing a reference maximum distance relative to the accessory window, and a distance sensor for measuring a target distance to a target; and wherein the accessory microprocessor compares a measured target distance with the reference maximum distance, and processes the image of the additional target data when the measured target distance does not exceed the reference maximum distance.

7. The system of claim 4, wherein the data capture assembly at the accessory reader includes a memory for storing a known set of values of optical characteristics of a target when the target lies in the restricted range; and wherein the accessory microprocessor is operative for determining values of the optical characteristics of the target, for comparing the determined values with the stored values, and for processing the image of the additional target data when the determined values do not exceed the stored values.

8. The system of claim 4, wherein the data capture assembly at the accessory reader includes a memory for storing a reference maximum distance relative to the accessory window, and an aiming light assembly for projecting an aiming light pattern on a target; and wherein the accessory microprocessor is operative for determining a target distance of the target based on a position of the aiming light pattern in the image, for comparing a determined target distance with the reference maximum distance, and for processing the image of the additional target data when the determined target distance does not exceed the reference maximum distance.

9. The system of claim 4, wherein the data capture assembly at the accessory reader includes an illumination light assembly having a plurality of illumination light sources for illuminating a target; and wherein the accessory microprocessor is operative for determining whether reflected bright light spots from the illumination light sources exist in the image, and for processing the image of the additional target data when the light spots are found in the image.

10. The system of claim 9, wherein two of the illumination light sources are spaced apart in the accessory reader, wherein the data capture assembly at the accessory reader includes a memory for storing a known set of values of spot distances between the reflected bright light spots from the two illumination light sources when the target lies in the restricted range; and wherein the accessory microprocessor is operative for determining a value of spot distance in the image, for comparing a determined value of the spot distance with the stored values, and for processing the image of the additional target data when the determined value does not exceed the stored values.

11. The system of claim 4, wherein the data capture arrangement at the workstation includes a workstation microprocessor, wherein the accessory imager is operative for capturing through the accessory window successive images of the additional target data over successive frames, and wherein at least one of the microprocessors is operative for comparing the successive images to track motion of the target.

12. The system of claim 4, wherein the data capture arrangement at the workstation includes a memory for storing the target data already processed by the workstation microprocessor, and wherein at least one of the microprocessors is operative for checking whether the additional target data captured by the accessory reader is stored in the memory, for rejecting the additional target data if the additional target data is stored in the memory, and for accepting the additional target data if the additional target data is not stored in the memory.

13. A checkout method, comprising:
configuring a bi-optical workstation with a first workstation window located in a generally horizontal plane, and a second workstation window located in a generally upright plane that intersects the generally horizontal plane;
positioning the workstation windows to face and be accessible to a clerk to enable the clerk to interact and operate the workstation;
capturing through at least one of the workstation windows target data of targets associated with products to be checked out by the clerk in a transaction, by passing the products through the workstation to a bagging area;
configuring an accessory reader installed inside the workstation with an accessory window that is accessible to a customer for enabling the customer to interact and operate the accessory reader;
positioning the accessory window to face the bagging area;
capturing additional target data of additional targets associated with items related to the transaction; and
preventing the accessory reader from capturing the target data of the targets associated with the products in the bagging area.

14. The method of claim 13, wherein the capturing of the target data by the workstation is performed by capturing an image of the target data, and by processing the image of the target data; and wherein the capturing of the additional target data by the accessory reader is performed by capturing an image of the additional target data over a restricted range of working distances that terminates short of the bagging area, and by processing the image of the additional target data.

15. The method of claim 14, wherein the capturing of the additional target data by the accessory reader is performed by restricting a depth of focus of an imaging lens assembly to limit the restricted range to a set of close-in working distances relative to the accessory window.

16. The method of claim 14, wherein the capturing of the additional target data by the accessory reader is performed by storing a reference maximum distance relative to the accessory window, measuring a target distance to a target, comparing a measured target distance with the reference maximum distance, and processing the image of the additional target data when the measured target distance does not exceed the reference maximum distance.

17. The method of claim 14, wherein the capturing of the additional target data by the accessory reader is performed by storing a known set of values of optical characteristics of a target when the target lies in the restricted range, determining values of the optical characteristics of the target, comparing the determined values with the stored values, and processing the image of the additional target data when the determined values do not exceed the stored values.

18. The method of claim 14, wherein the capturing of the additional target data by the accessory reader is performed by storing a reference maximum distance relative to the accessory window, projecting an aiming light pattern on a target, determining a target distance of the target based on a position of the aiming light pattern in the image, comparing a determined target distance with the reference maximum distance, and processing the image of the additional target data when the determined target distance does not exceed the reference maximum distance.

19. The method of claim 14, wherein the capturing of the additional target data by the accessory reader is performed by illuminating a target with a plurality of illumination light sources, determining whether reflected bright light spots from the illumination light sources exist in the image, and processing the image of the additional target data when the light spots are found in the image.

20. The method of claim 14, and tracking motion of the target by capturing through the accessory window successive images of the additional target data over successive frames, and comparing the successive images.

* * * * *